United States Patent
Symes, Jr.

(10) Patent No.: US 9,852,848 B2
(45) Date of Patent: Dec. 26, 2017

(54) COG DIELECTRIC COMPOSITION FOR USE WITH NICKEL ELECTRODES

(71) Applicant: Ferro Corportion, Mayfield Heights, OH (US)

(72) Inventor: Walter J. Symes, Jr., Dundee, NY (US)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 15/317,545

(22) PCT Filed: Jun. 27, 2016

(86) PCT No.: PCT/US2016/039502
§ 371 (c)(1),
(2) Date: Dec. 9, 2016

(87) PCT Pub. No.: WO2017/014918
PCT Pub. Date: Jan. 26, 2017

(65) Prior Publication Data
US 2017/0200557 A1    Jul. 13, 2017

Related U.S. Application Data

(60) Provisional application No. 62/195,842, filed on Jul. 23, 2015.

(51) Int. Cl.
*H01G 4/12* (2006.01)
*C04B 35/49* (2006.01)
(Continued)

(52) U.S. Cl.
CPC ......... *H01G 4/1245* (2013.01); *B28B 11/125* (2013.01); *C04B 35/49* (2013.01);
(Continued)

(58) Field of Classification Search
CPC .......................... C04B 35/49; H01G 4/12245
See application file for complete search history.

(56) References Cited

U.S. PATENT DOCUMENTS

| 4,379,319 A | 4/1983 | Wilson |
| 4,540,676 A | 9/1985 | Chu et al. |

(Continued)

FOREIGN PATENT DOCUMENTS

| WO | 2016/137790 A1 | 9/2016 |

OTHER PUBLICATIONS

U.S. Appl. No. 62/264,878, filed Sep. 30, 2015, Symes.*
International Search Report for corresponding PCT/US2016/039502 dated Nov. 10, 2016, one page.

*Primary Examiner* — Karl Group
(74) *Attorney, Agent, or Firm* — Rankin, Hill & Clark LLP

(57) ABSTRACT

Multilayer ceramic chip capacitors which satisfy COG requirements and which are compatible with reducing atmosphere sintering conditions so that non-noble metals such as nickel and nickel alloys thereof may be used for internal and external electrodes are made in accordance with the invention. The capacitors exhibit desirable dielectric properties (high capacitance, low dissipation factor, high insulation resistance), excellent performance on highly accelerated life testing, and very good resistance to dielectric breakdown. The dielectric layers comprise a barium strontium zirconate matrix doped with other metal oxides such as $TiO_2$, CaO, $B_2O_3$, and MgO in various combinations.

21 Claims, 1 Drawing Sheet

(51) Int. Cl.
*B28B 11/12* (2006.01)
*C04B 35/622* (2006.01)
*C04B 35/64* (2006.01)
*H01G 4/008* (2006.01)
*H01G 4/30* (2006.01)

(52) U.S. Cl.
CPC ........ *C04B 35/62222* (2013.01); *C04B 35/64* (2013.01); *H01G 4/008* (2013.01); *H01G 4/30* (2013.01); *C04B 2235/3206* (2013.01); *C04B 2235/3208* (2013.01); *C04B 2235/3213* (2013.01); *C04B 2235/3215* (2013.01); *C04B 2235/3236* (2013.01); *C04B 2235/3249* (2013.01); *C04B 2235/3409* (2013.01); *C04B 2235/656* (2013.01)

(56) References Cited

U.S. PATENT DOCUMENTS

| | | |
|---|---|---|
| 4,816,430 A | 3/1989 | Chu |
| 4,882,305 A | 11/1989 | Chu et al. |
| 5,258,335 A | 11/1993 | Muralidhar et al. |
| 5,296,426 A | 3/1994 | Burn |
| 5,571,767 A | 11/1996 | Wilson et al. |
| 5,601,673 A | 2/1997 | Alexander |
| 5,661,882 A | 9/1997 | Alexander |
| 5,790,367 A | 8/1998 | Mateika et al. |
| 5,841,625 A | 11/1998 | Hennings et al. |
| 5,994,253 A | 11/1999 | Sasaki et al. |
| 6,043,174 A | 3/2000 | Maher et al. |
| 6,078,494 A | 6/2000 | Hansen |
| 6,185,087 B1 | 2/2001 | Park et al. |
| 6,723,673 B2 | 4/2004 | Maher et al. |
| 7,161,795 B1 | 1/2007 | Megherhi et al. |
| 7,230,817 B2 | 6/2007 | Megherhi et al. |
| 7,521,390 B2 | 4/2009 | Symes, Jr. et al. |
| 7,541,306 B2 | 6/2009 | Koebrugge et al. |
| 7,858,548 B2 | 12/2010 | Symes, Jr. et al. |
| 8,043,721 B2 | 10/2011 | Khadilkar et al. |
| 8,114,801 B2 * | 2/2012 | Symes, Jr. ............ C04B 35/486 264/615 |
| 8,305,731 B2 | 11/2012 | Symes, Jr. et al. |
| 9,613,756 B2 * | 4/2017 | Nishimura ............ C04B 35/486 |
| 2003/0125192 A1 * | 7/2003 | Moon .................... B32B 18/00 501/135 |
| 2007/0018776 A1 | 1/2007 | Tanaka et al. |
| 2010/0120607 A1 | 5/2010 | Kim et al. |
| 2014/0196937 A1 | 7/2014 | Park et al. |
| 2016/0240313 A1 | 8/2016 | Symes, Jr. |

* cited by examiner

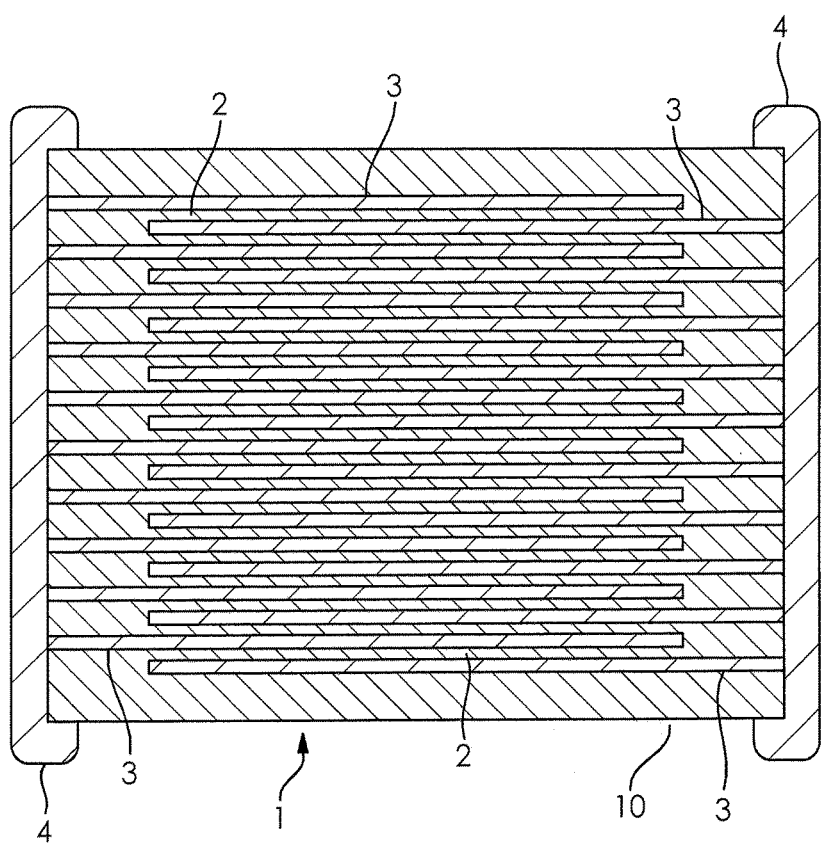

COG DIELECTRIC COMPOSITION FOR USE WITH NICKEL ELECTRODES

BACKGROUND OF THE INVENTION

1. Field of Invention

This invention relates to a zirconate titanate based dielectric composition, and more particularly to a doped barium-strontium-zirconate based dielectric composition that can be used to form multilayer ceramic chip capacitors having internal base metal electrodes formed of nickel or nickel alloys.

2. Description of Related Art

Multilayer ceramic chip capacitors have been widely utilized as miniature-sized, high capacitance and high reliability electronic components. In accordance with increasing demands for high-performance electronic equipment, multilayer ceramic chip capacitors also have encountered marketplace demand for smaller size, higher capacitance, lower cost, and higher reliability.

Multilayer ceramic chip capacitors generally are fabricated by forming alternating layers of an internal electrode forming paste and a dielectric layer-forming paste. Such layers are typically formed by sheeting, printing, or similar techniques, followed by concurrent firing.

Generally, the internal electrodes have been formed of conductors such as palladium, gold, silver or alloys of the foregoing. Although palladium, gold and silver are expensive, they can be partially replaced by the use of relatively inexpensive base metals such as nickel and its alloys. A "base metal" is any metal other than gold, silver, palladium, and platinum. Base metal internal electrodes can become oxidized if fired in ambient air, so the dielectric layers and internal electrode layers must be co-fired in a reducing atmosphere. Firing in a reducing atmosphere, however, causes the dielectric layers to be reduced, which decreases resistivity. Multilayer ceramic chip capacitors using non-reducible dielectric materials have been proposed, however, such devices typically have a shorter life of insulation resistance (IR) and low reliability.

The Electronic Industry Association (EIA) prescribes a standard for the temperature coefficient of capacitance (TCC) known as the COG characteristic. The COG characteristic requires that the change of capacitance be no greater than 30 ppm per degree centigrade (±30 ppm/° C.) over the temperature range −55° C. to +125° C. COG components do not exhibit capacitance aging.

SUMMARY OF THE INVENTION

The invention provides a dielectric composition that can be used to make ceramic multilayer capacitors compatible with internal electrodes containing base metals such as nickel or nickel alloys. Capacitors may be formed from the dielectric composition of the invention to exhibit a stable dielectric constant with a small dielectric loss and excellent reliability under highly accelerated life testing conditions.

The dielectric composition of the invention comprises a uniform dense microstructure of grains having an average diameter of about 0.5 to about 3 microns. A uniform and dense grain microstructure is critical in achieving high reliability multilayer capacitors having dielectric layers thinner than 5 microns.

In one embodiment, the dielectric composition, which may be in the form of a paste, of the invention comprises, prior to firing, a blend of the oxides of barium, strontium, and zirconium. Oxides such as CaO and $TiO_2$ may be added to adjust TCC values. Hence an embodiment of the invention is a composition comprising a mixture of precursors that, upon firing, forms a dielectric material comprising a barium-strontium-zirconate matrix doped with minor amounts of calcium and titanium. Minor amounts means 3 wt % or less. Oxides to aid in sintering such as MgO and $B_2O_3$, may be added.

A composition comprising a mixture of precursors that, upon firing, forms a dielectric material comprising a barium-strontium-zirconate matrix doped with minor amounts of calcium and titanium.

A composition comprising a mixture of precursors that, upon firing, forms a dielectric material comprising: from about 26.5 wt % to about 34.0 wt % BaO; from about 18.0 wt % to about 24.5 wt % SrO; from about 41.0 wt % to about 50.0 wt % $ZrO_2$; from about 0.50 wt % to about 1.50 wt % CaO; and from about 0.70 wt % to about 2.50 wt % $TiO_2$. In this embodiment, the dielectric material may further comprise precursors such that upon firing the dielectric material further comprises from about 0.10 wt % to about 1.0 wt % $B_2O_3$; and from about 0.31 wt % to about 1.47 wt % MgO.

An embodiment of the invention is a method of forming an electronic component comprising: applying any dielectric paste, dielectric material or any mixture of precursors disclosed elsewhere herein to a substrate; and firing the substrate at a temperature sufficient to sinter the dielectric paste, dielectric material or any mixture of precursors.

An embodiment of the invention is a multilayer ceramic chip capacitor comprising a fired collection of alternately stacked: layers of any dielectric paste, dielectric material or any mixture of precursors disclosed elsewhere herein; and layers of an internal electrode material comprising a transition metal other than Ag, Au, Pd, or Pt.

An embodiment of the invention is a method of forming an electronic component comprising alternately
  applying layers of:
  any dielectric paste, dielectric material or any mixture of precursors disclosed elsewhere herein, and
  a metal-containing electrode paste onto a substrate to form a laminar stack;
  cutting the laminar stack to a predetermined shape;
  separating the cut stack from the substrate; and
  firing the stack to densify the metal in the electrode paste and sinter the dielectric paste, wherein the internal electrode layer and the dielectric layer each have a layer thickness.

The method may further comprise applying a paste containing a conductive metal to the ends of the dielectric and electrode layers and firing to form a multilayer capacitor. The conductive metal is preferably copper.

An embodiment of the invention is a lead-free and cadmium-free dielectric paste comprising a solids portion wherein the solids portion comprises:
  from about 34.1 wt % to about 43.8 wt % $BaCO_3$;
  from about 25.6 wt % to about 34.9 wt % $SrCO_3$;
  from about 41.0 wt % to about 50.0 wt % $ZrO_2$;
  from about 0.70 wt % to about 2.50 wt % $TiO_2$; and
  from about 0.89 wt % to about 2.70 wt % $CaCO_3$.

An embodiment of the invention is a lead-free and cadmium-free dielectric paste comprising a solids portion wherein the solids portion comprises:
  from about 47.8 wt % to about 61.3 wt % $BaZrO_3$;
  from about 1.6 wt % to about 5.7 wt % $SrTiO_3$;
  from about 39.4 wt % to about 53.6 wt % $SrZrO_3$;
  from about 1.2 wt % to about 3.6 wt % $CaTiO_3$; and
  from about 1.6 wt % to about 4.8 wt % $CaZrO_3$.

An embodiment of the invention is a lead-free and cadmium-free dielectric paste comprising a solids portion wherein the solids portion comprises:
から about 47.8 wt % to about 61.3 wt % $BaZrO_3$;
from about 39.4 wt % to about 53.6 wt % $SrZrO_3$;
from about 1.2 wt % to about 3.6 wt % $CaTiO_3$;
from about 0.1 wt % to about 2.14 wt % $Mg(OH)_2$; and
from about 0.1 wt % to about 1.78 wt % $H_3BO_3$.

An embodiment of the invention is a lead-free and cadmium-free dielectric composition comprising:
from about 47.8 wt % to about 61.3 wt % $BaZrO_3$;
from about 39.4 wt % to about 53.6 wt % $SrZrO_3$;
from about 1.2 wt % to about 3.6 wt % $CaTiO_3$;
from about 0.1 wt % to about 2.14 wt % $Mg(OH)_2$; and
from about 0.1 wt % to about 1.78 wt % $H_3BO_3$.

Another embodiment of the invention is an electronic device comprising a multilayer chip comprising a dielectric layer comprising a barium strontium zirconate mix doped with a calcium titanate mix and a magnesium oxide-boron oxide mix.

In another embodiment, the invention provides a method of forming an electronic component comprising applying particles of a dielectric material to a substrate and firing the substrate at a temperature sufficient to sinter the dielectric material, wherein the dielectric material comprises, prior to firing, a blend (in weight percent) of the ingredients in Table 1. It is to be understood that each numerical value herein (percentage, temperature, etc) is presumed to be preceded by "about."

TABLE 1

Oxide Formulations of Dielectric Compositions

|  | BaO | SrO | $ZrO_2$ | CaO | $TiO_2$ | $B_2O_3$ | MgO |
|---|---|---|---|---|---|---|---|
| Wt % | 26.5-34.0 | 18.0-24.5 | 41.0-50.0 | 0.50-1.50 | 0.70-2.50 | 0.10-1.0 | 0.31-1.47 |

Another route is to begin with barium carbonate, strontium carbonate, zirconium oxide, titanium dioxide, and calcium carbonate. In this regard, the formulations of Table 2 will result in approximately the same dielectric materials as that made by the formulations of Table 1.

TABLE 2

Alternate Formulations for Dielectric Compositions

|  | $BaCO_3$ | $SrCO_3$ | $ZrO_2$ | $TiO_2$ | $CaCO_3$ | $B_2O_3$ | MgO |
|---|---|---|---|---|---|---|---|
| Wt % | 34.1-43.8 | 25.6-34.9 | 41.0-50.0 | 0.70-2.50 | 0.89-2.70 | 0.10-1.0 | 0.31-1.47 |

The composition can also be made by firing a blend of one or more pre-reacted oxides such as barium titanate ($BaTiO_3$), barium zirconate ($BaZrO_3$), strontium titanate ($SrTiO_3$), strontium zirconate ($SrZrO_3$), calcium titanate ($CaTiO_3$), calcium zirconate ($CaZrO_3$). In this regard, the formulations of Table 3 will result in approximately the same dielectric materials as that made by the formulations of Table 1.

TABLE 3

Alternate Formulations of Dielectric Compositions

|  | $BaTiO_3$ | $BaZrO_3$ | $SrTiO_3$ | $SrZrO_3$ | $CaZrO_3$ | $CaTiO_3$ | $B_2O_3$ | MgO |
|---|---|---|---|---|---|---|---|---|
| Wt % | 0.0-7.3 | 47.8-61.3 | 1.6-5.7 | 39.4-53.6 | 1.6-4.8 | 1.2-3.6 | 0.10-1.0 | 0.31-1.47 |

The foregoing and other features of the invention are hereinafter more fully described and particularly pointed out in the claims, the following description setting forth in detail certain illustrative embodiments of the invention, these being indicative, however, of but a few of the various ways in which the principles of the invention may be employed.

BRIEF DESCRIPTION OF THE DRAWINGS

The FIGURE is a cross-sectional view of a multilayer ceramic chip capacitor according to an embodiment of the invention.

DETAILED DESCRIPTION OF THE INVENTION

Multilayer chip capacitors are fabricated by alternately stacking dielectric layers and internal electrodes to form green chips. The internal electrodes of interest herein are comprised of base metals including nickel or nickel alloys. The dielectric composition that forms the dielectric layers is produced by wet milling the components of the dielectric with an organic vehicle system. The dielectric composition is deposited on a carrier film, such as polyester or polypropylene, or a belt, such as stainless steel, paper, or a substrate such as alumina or glass, coating the film, and forming sheets, which are alternately stacked with electrodes to form the green chips.

After the green chips are formed, the organic vehicle is removed by heating to a temperature less than about 350° C. in an air atmosphere. Once the vehicle is removed, the green chips are then fired in a reducing atmosphere of wet nitrogen and hydrogen having an oxygen partial pressure of about $10^{-12}$ to about $10^{-8}$ atm, at a temperature of about 1100° C. to about 1400° C., preferably about 1200° C. to about 1350° C., more preferably about 1225° C. to about 1325° C. Various heating profiles may be used both for removing the binder and for firing the chip.

The configuration of multilayer ceramic capacitors is well known in the art. With reference to FIG. 1, an exemplary structure of a multilayer ceramic chip capacitor 1 is shown. External electrodes 4 of the capacitor 1 are disposed on side surfaces of the capacitor chip 1 and in electrical connection with internal electrode layers 3. The capacitor chip 1 has a plurality of alternately stacked dielectric layers 2. The shape of the capacitor chip 1 is not critical although it is often rectangular shaped. Also, the size is not critical and the chip may have appropriate dimensions in accordance with a particular application, typically in the range of 1.0 to 5.6 mm×0.5 to 5.0 mm×0.5 to 1.9 mm. The internal electrode layers 3 are stacked such that at opposite ends they are alternately exposed at opposite side surfaces of the chip 1. That is, the internal electrode layers 3 of one group are exposed at one side surface of the chip 1 and the internal electrode layers 3 of another group are exposed at the opposite side surface of the chip 1. One external electrode 4 is applied to one side surface of the capacitor chip 1 in electrical contact with the internal electrode layers 3 of the one group, and the other external electrode 4 is applied to the opposite side surface of the chip 1 in electrical contact with the internal electrode layers 3 of the other group.

The invention provides a composition comprising a mixture of precursors that, upon firing, forms a dielectric material comprising a barium-strontium-zirconate matrix doped with at least calcium and titanium. In some embodiments, the mixture further comprises precursors such that, upon firing, result in the dielectric material further comprising one or more dopants selected from the group consisting of boron and magnesium. The dielectric material formed from compositions according to the invention exhibits a dielectric constant greater than 35, preferably greater than 40, more preferably greater than 45.

The dielectric layers are formed of a dielectric material formed by sintering a blend including oxides of barium, calcium, strontium, titanium and zirconium, as in Tables 1 or 2. A sintering aid including $B_2O_3$ and MgO may be useful.

Another route is to begin with barium titanate, barium zirconate, strontium titanate, strontium zirconate, calcium zirconate, calcium titanate, as in Table 3. It should be evident to those who are familiar with the art that the above mentioned oxides in their hydroxide or other forms such as carbonates, acetates, nitrates, and organometallic compounds such as metal formates, oxalates, etc., have the same effect, so long as the desired metal ion is provided in the desired quantity.

Other compounds may be present in the dielectric material provided that the other compound does not adversely affect dielectric properties. Such compounds are usually found in the raw materials as impurities.

The dielectric compositions herein possess fine crystal grains that typically have a mean size of about 0.5 to about 3 microns, with a grain size of less than about 0.7 micron being preferred.

Each dielectric layer has a thickness of up to about 50 microns. Preferably, the thickness of each dielectric layer is from about 0.5 microns to about 50 microns. More preferably, the thickness of each dielectric layer is from about 2 microns to about 10 microns. The compositions herein may be employed to make multilayer ceramic chip capacitors having thin dielectric layers to ensure minimal degradation of capacitance over the service life. The number of dielectric layers stacked in a chip capacitor is generally from about 2 to about 800, and preferably from about 3 to about 400.

The multilayer ceramic chip capacitor of the invention generally is fabricated by forming a green chip by conventional printing and sheeting methods using pastes, and firing the green chip. After firing, the chip is tumbled dry in a medium such as alumina or silica to round off corners. Next, a conductive paste, containing, for example, copper is then applied to both ends to connect the exposed inner electrodes together to make terminations. The chip is then termination fired at about 800° C. in a nitrogen atmosphere to sinter the conductor (e.g., copper) into a solid conduction pad at both ends, to form a multilayer capacitor. The terminations are external electrodes 4 as shown in FIG. 1.

Dielectric Pastes. A paste for forming the dielectric layers can be obtained by mixing an organic vehicle with a raw dielectric material, comprising various oxides, as disclosed herein. Also useful are precursor compounds that convert to such oxides and composite oxides upon firing, as stated hereinabove. The dielectric material is obtained by selecting compounds containing these oxides, or precursors of these oxides, and mixing them in the appropriate proportions. The proportion of such compounds in the raw dielectric material is determined such that after firing, the desired dielectric layer composition may be obtained. The raw dielectric material is generally used in powder form having a mean particle size of about 0.1 to about 3 microns, and more preferably about 1 micron or less.

Organic Vehicle. The organic vehicle is a binder in an organic solvent or a binder in water. The choice of binder used herein is not critical; conventional binders such as ethyl cellulose, polyvinyl butanol, ethyl cellulose, and hydroxypropyl cellulose, and combinations thereof are appropriate together with a solvent. The organic solvent is also not critical and may be selected in accordance with a particular application method (i.e., printing or sheeting), from conventional organic solvents such as butyl carbitol, acetone, toluene, ethanol, diethylene glycol butyl ether; 2,2,4-trimethyl pentanediol monoisobutyrate (Texanol®); alpha-terpineol; beta-terpineol; gamma terpineol; tridecyl alcohol; diethylene glycol ethyl ether (Carbitol®), diethylene glycol butyl ether (Butyl Carbitol®) and propylene glycol; and blends thereof, Products sold under the Texanol® trademark are available from Eastman Chemical Company, Kingsport, Tenn.; those sold under the Dowanol® and Carbitol® trademarks are available from Dow Chemical Co., Midland, Mich.

No particular limit is imposed on the organic vehicle content of the respective pastes (dielectric or electrode pastes). Often the paste contains about 1 to 5 wt % of the binder and about 10 to 50 wt % of the organic so vent, with the balance being either the metal component (for an electrode) or a dielectric component (for a dielectric layer). If desired, the respective pastes may contain up to about 10 wt % of other additives such as dispersants, plasticizers, dielectric compounds, and insulating compounds.

Internal Electrode. A paste for forming internal electrode layers is obtained by mixing an electro-conductive material with an organic vehicle. The conductive material used herein includes conductors such as conductive metals and alloys as mentioned herein and various compounds which convert into such conductors upon firing, for example, oxides, organometallic compounds and resinates.

With reference to FIG. 1, the conductor that forms the internal electrode layers 3 is not critical, although a base metal preferably is used since the dielectric material of the dielectric layers 2 has anti-reducing properties. Typical base metals include nickel and its alloys. Preferred nickel alloys contain at least one other metal selected from Mn, Cr, Co, Cu, and Al. Alloys containing at least about 95 wt % of nickel are preferred. It is to be noted that nickel and nickel alloys may contain up to about 0.1 wt % of phosphorous and other trace components (i.e., impurities). The thickness of the internal electrode layers may be controlled to suit a particular application, but the layers are typically up to about 5 microns thick. Preferably, an internal electrode layer has a thickness of about 0.5 to about 5 microns and more preferably about 1 to about 5 microns.

External Electrode. The conductor that forms the external electrodes 4 is not critical, although inexpensive metals such as copper, nickel, and alloys of either or both, optionally containing Mn, Cr, Co, or Al, are preferred. The thickness of the external electrode layers may be controlled to suit a particular application, but the layers are typically up about 10 to about 50 microns thick, preferably about 20 to about 40 microns thick. Paste for forming external electrodes is prepared by the same method as for the internal electrodes.

A green chip then may be prepared from the dielectric layer-forming paste and the internal electrode layer-forming paste. In the case of a printing method, a green chip is prepared by alternately printing the pastes onto a substrate of a polyester film, (e.g., polyethylene terephthalate (PET)), in laminar form, cutting the laminar stack to a predetermined shape and separating it from the substrate. Also useful is a sheeting method wherein a green chip is prepared by forming green sheets from the dielectric layer-forming paste, printing the internal electrode layer-forming paste on the respective green sheets, and stacking the printed green sheets. After the organic vehicle is removed from the green chip, it is fired. The organic vehicle may be removed under conventional conditions, by heating at a rate of 0.01° C. to 20° C./hour, more preferably about 0.03-0.1° C./hour, with a hold temperature of about 150° C. to about 350° C., preferably about 200° C. to about 300° C., more preferably about 250° C., and a hold time of about 30-700 minutes, preferably about 200-300 minutes in an air atmosphere.

Firing. The green chip is then fired in an atmosphere which is determined according to the type of conductor in the internal electrode layer-forming paste. Where the internal electrode layers are formed of a base metal conductor such as nickel and nickel alloys, the firing atmosphere may have an oxygen partial pressure of about $10^{-12}$ to about $10^{-8}$ atm. Sintering at a partial pressure lower than about $10^{-12}$ atm should be avoided, since at such low pressures the conductor can be abnormally sintered and may become disconnected from the dielectric layers. At oxygen partial pressures above about $10^{-8}$ atm, the internal electrode layers may be oxidized. Oxygen partial pressures of about $10^{-11}$ to about $10^{-9}$ atm are most preferred.

For firing, the temperature is raised from room temperature to a peak temperature of from about 1200° C. to about 1300° C., more preferably about 1225° C. The temperature is held for about two hours to enhance densification. Lower hold temperatures provide insufficient densification whereas higher hold temperatures can lead to very large grains. The firing is preferably conducted in a reducing atmosphere. An exemplary firing atmosphere includes wet $N_2$, or a humidified mixture of $N_2$ and $H_2$ gases. The sintering ramp rate is about 50° C. to about 500° C./hour, preferably about 200° C. to 300° C./hour; hold temperature of about 1225° C. The hold time is about 0.5 to about 8 hours, preferably about 1 to 3 hours, more preferably 2 hours and the cooling rate is about 50° C. to 500° C./hour, preferably about 200° C. to 300° C./hour.

The organic vehicle removal and firing may be carried out either continuously or separately. If continuously, the process includes organic vehicle removal, changing the atmosphere without cooling, heating to the firing temperature, holding at the firing temperature for a specified time and cooling afterwards. If separately, after organic vehicle removal and cool down, the temperature of the chip is raised to the sintering temperature and the atmosphere then is changed to a reducing atmosphere.

The resulting chip may be polished at end faces by barrel tumbling and/or sand blasting, for example, before the external electrode-forming paste is printed or transferred and fired to form external electrodes (terminations). Firing of the external electrode-forming paste may be carried out in a dry nitrogen atmosphere (about $10^{-6}$ atm oxygen partial pressure), at about 600° C. to 800° C., for about 10 minutes to about 1 hour.

If necessary, pads are formed on the external electrodes by plating or other methods known in the art. The multilayer ceramic chip capacitors of the invention can be mounted on printed circuit boards, for example, by soldering.

EXAMPLE

The following examples are provided to illustrate preferred aspects of the invention and are not intended to limit the scope of the invention.

Overview. Multilayer ceramic capacitors with pure nickel electrodes, 10 active layers, with each layer being 10 to 13 microns thick were prepared and sintered in a reducing atmosphere ($pO_2$ of ~$10^{-10}$ atm) at 1225° C. Physical and electrical measurements were carried out.

Example 1

A dielectric composition identified as Sample 1 was formed by milling in water appropriate amounts of the oxides as shown in Table 4. The powders were milled in 1 liter polypropylene jar with 1% Darvan® C, a polymeric deflocculant available from RT Vanderbilt Co., Inc., Norwalk, Conn., using 2 mm YTZ (yttria stabilized zirconia) to a particle $D_{50}$ of about 0.65 micron.

TABLE 4

| Formulation of Sample 1 Prior to Firing | | | | |
|---|---|---|---|---|
| $BaZrO_3$ | $SrZrO_3$ | $CaTiO_3$ | $Mg(OH)_2$ | $H_3BO_3$ |
| Wt % 53.771 | 44.114 | 1.497 | 0.300 | 0.318 |

The dried powder was pulverized by conventional means to afford the dielectric powder of Example 1.

The final powders had an average particle size of 0.3 to 1 micron. One hundred grams of the above powders was then added to 28.8 grams of an organic vehicle comprising polyvinyl butanol, toluene, and ethanol, and wet milled for 24 hours to prepare a slurry for tape casting. The wet slurry was coated on a polyester film to form dielectric green tapes. The thickness of the dielectric green tapes was about 15 microns. Nickel electrodes were printed onto the dried green dielectric tape by conventional screen-printing methods using a conventional nickel paste. A total of 10 sheets were stacked and bonded under a pressure of 5100 psi and a temperature of 130° F. (54° C.) to form a green chip. After dicing to a suitable dimension so that, after sintering and shrinkage, (which is typically from 15% to 20% in both X and Y directions), the chip dimension is about 0.12" (L)× 0.06" (W) (EIA1206 size) or 0.08" (L)×0.05" (W) (EIA0805 size), the green chip was heated to remove the organic vehicle accordance with the burn-out cycle of Table 5.

TABLE 5

| Binder Removal Conditions | | | |
|---|---|---|---|
| Stage | Temp (° C.) | Duration (min) | Atmosphere |
| Ramp from room temp to | 265 | 1200 | Air |
| Soak at | 265 | 240 | Air |
| Cool to room temp | 25 | to reach 25° C. | Air |

For example 1, chips first had their binder removed at a temperature of about 265° C. and then were sintered at a temperature of 1225° C. in a gas mixture of $N_2/H_2/H_2O$ at a $pO_2$ of ~$10^{-10}$ atm. The gas mixture was achieved by humidifying the $N_2/H_2$ gases through a wetter with a water temperature of 23° C. The chip thus obtained was corner rounded by tumbling. An external electrode forming copper paste available as TM50-081 from Ferro Corporation of Cleveland, Ohio was applied to the end faces and fired in a dry nitrogen atmosphere at 775° C. for about 70 minutes to form external electrodes. The multilayer capacitor thus processed had dimensions of about 3.2 mm×1.6 mm (EIA 1206 size) with variable thickness. The dielectric layers were 9.7 microns thick, and the internal nickel electrode layers were about 1.5 microns thick.

Multilayer chip capacitors were made from the powders of Example 1 and tested. Firing conditions as well as electrical properties are summarized in Table 6.

TABLE 6

Firing Conditions and Electrical Properties for MLCCs of Example 1

| Sample | 1 |
|---|---|
| Sintering Temp (° C.) | 1225 |
| Sintering Time (hours) | 2 |
| $pO_2$ (atm) | $10^{-10}$ |
| Dielectric Thickness (microns) | 9.7 |
| Capacitance (pF) | 753.8 |
| DF (%) | <0.00001 |
| Dielectric Constant | 45 |
| TCC (ppm/° C.) | |
| −55° C. | NPO |
| 85° C. | +1 |
| 125° C. | +5 |
| RC (MΩ × μF) | |
| 25° C. | >20,000 |
| 125° C. | 4,160 |
| Breakdown Voltage (V) | 970 |

Further embodiments are captured in the following items.

Item 1. A composition comprising a mixture of precursors that, upon firing, forms a dielectric material comprising a barium-strontium-zirconate matrix doped with minor amounts of calcium and titanium.

Item 2. The composition according to item 1, wherein the mixture further comprises precursors such that, upon firing, result in the dielectric material further comprises one or more dopants selected from the group consisting of boron and magnesium.

Item 3. The composition according to item 2, wherein the dielectric material exhibits a dielectric constant greater than 35.

Item 4. The composition according to item 1 comprising a mixture of precursors that, upon firing, forms a dielectric material comprising:
from about 26.5 wt % to about 34.0 wt % BaO;
from about 18.0 wt % to about 24.5 wt % SrO;
from about 41.0 wt % to about 50.0 wt % $ZrO_2$;
from about 0.50 wt % to about 1.50 wt % CaO; and
from about 0.70 wt % to about 2.50 wt % $TiO_2$.

Item 5. The composition according to item 4, wherein the mixture of precursors further comprises:
from about 0.01 to about 1.0 wt % $B_2O_3$; and
from about 0.01 to about 1.47 wt % MgO.

Item 6. The composition according to item 2 comprising a mixture of precursors that, upon firing, forms a dielectric material comprising:
from about 26.5 wt % to about 34.0 wt % BaO;
from about 18.0 wt % to about 24.5 wt % SrO;
from about 41.0 wt % to about 50.0 wt % $ZrO_2$;
from about 0.50 wt % to about 1.50 wt % CaO;
from about 0.70 wt % to about 2.50 wt % $TiO_2$;
from about 0.10 wt % to about 1.0 wt % $B_2O_3$; and
from about 0.31 wt % to about 1.47 wt % MgO.

Item 7. A lead-free and cadmium-free dielectric paste comprising a solids portion wherein the solids portion comprises:
from about 26.5 wt % to about 34.0 wt % BaO;
from about 18.0 wt % to about 24.5 wt % SrO;
from about 41.0 wt % to about 50.0 wt % $ZrO_2$;
from about 0.50 wt % to about 1.50 wt % CaO; and
from about 0.70 wt % to about 2.50 wt % $TiO_2$.

Item 8. The lead-free and cadmium-free dielectric paste of item 7, further comprising, at least one selected from the group consisting of:
from about 0.01 to about 1.0 wt % $B_2O_3$;
from about 0.01 to about 1.47 wt % MgO;
from about 0.01 to about 1.78 wt % $H_3BO_3$; and
from about 0.01 to about 2.14 wt % $Mg(OH)_2$.

Item 9. A method of forming an electronic component comprising:
applying the dielectric paste of item 7 or item 8 to a substrate; and
firing the substrate at a temperature sufficient to sinter the dielectric paste.

Item 10. The method of item 9, wherein the firing is conducted at a temperature of from about 1200° C., to about 1350° C.

Item 11. The method of item 9, wherein the firing is conducted in an atmosphere having a partial oxygen pressure of about $10^{-12}$ atm to about $10^{-8}$ atm.

Item 12. A multilayer ceramic chip capacitor comprising a fired collection of alternately stacked:
layers of the dielectric paste of item 7 or item 8; and
layers of an internal electrode material comprising a transition metal other than Ag, Au, Pd, or Pt.

Item 13. The multilayer ceramic chip capacitor of item 12, wherein the internal electrode material comprises nickel.

Item 14. A method of forming an electronic component comprising:
alternately applying layers of
the dielectric paste of item 7 or item 8, and
a metal-containing electrode paste
onto a substrate to form a laminar stack;
cutting the laminar stack to a predetermined shape;
separating the cut stack from the substrate; and
firing the stack to densify the metal in the electrode paste and sinter the dielectric paste, wherein the internal electrode layer and the dielectric layer each have a layer thickness.

Item 15. The method of item 14, wherein the layers of the dielectric, after firing, have a thickness of about 1 micron to about 50 microns.

Item 16. The method of item 14, wherein the firing is conducted at a temperature of from about 1200° C. to about 1350° C.

Item 17. The method of item 14, wherein the firing is conducted in an atmosphere having a partial oxygen pressure of about $10^{-12}$ atm to about $10^{-8}$ atm.

Item 18. The method of item 14, wherein the metal-containing electrode paste comprises nickel.

Item 19. A lead-free and cadmium-free dielectric paste comprising a solids portion wherein the solids portion comprises:
from about 34.1 wt % to about 43.8 wt % $BaCO_3$;
from about 25.6 wt % to about 34.9 wt % $SrCO_3$;
from about 41.0 wt % to about 50.0 wt % $ZrO_2$;

from about 0.70 wt % to about 2.50 wt % $TiO_2$; and
from about 0.89 wt % to about 2.70 wt % $CaCO_3$.

Item 20. The lead-free and cadmium-free dielectric paste of item 19, further comprising at least one selected from the group consisting of:
from about 0.01 to about 1.0 wt % $B_2O_3$;
from about 0.01 to about 1.47 wt % MgO;
from about 0.01 to about 1.78 wt % $H_3BO_3$; and
from about 0.01 to about 2.14 wt % $Mg(OH)_2$.

Item 21. A method of forming an electronic component comprising:
applying the dielectric paste of item 19 or item 20 to a substrate; and
firing the substrate at a temperature sufficient to sinter the dielectric paste.

Item 22. The method of item 21, wherein the firing is conducted at a temperature of from about 1200° C. to about 1350° C.

Item 23. The method of item 21, wherein the firing is conducted in an atmosphere having a partial oxygen pressure of about $10^{-12}$ atm to about $10^{-8}$ atm.

Item 24. A multilayer ceramic chip capacitor comprising a fired collection of:
alternately stacked:
layers of the dielectric paste of item 19 or item 20; and
layers of an internal electrode material comprising a transition metal other than Ag, Au, Pd, or Pt.

Item 25. The multilayer ceramic chip capacitor of item 24, wherein the internal electrode material comprises nickel.

Item 26. A method of forming an electronic component comprising:
alternately applying
layers of the dielectric paste of item 19 or item 20, and
layers of a metal-containing electrode paste
onto a substrate to form a laminar stack;
cutting the laminar stack to a predetermined shape;
separating the cut stack from the substrate; and
firing the stack to densify the metal in the electrode paste and sinter the dielectric paste, wherein the internal electrode layer and the dielectric layer each have a layer thickness.

Item 27. The method of item 26, wherein the layers of dielectric, after firing, have a thickness of about 1 micron to about 50 microns.

Item 28. The method of item 26, wherein the firing is conducted at a temperature of from about 1200° C. to about 1350° C.

Item 29. The method of item 26, wherein the firing is conducted in an atmosphere having a partial oxygen pressure of about $10^{-12}$ atm to about $10^{-8}$ atm.

Item 30. The method of item 26, wherein the metal-containing electrode paste comprises nickel.

Item 31. A lead-free and cadmium-free dielectric paste comprising a solids portion wherein the solids portion comprises:
from about 47.8 wt % to about 61.3 wt % $BaZrO_3$;
from about 1.6 wt % to about 5.7 wt % $SrTiO_3$;
from about 39.4 wt % to about 53.6 wt % $SrZrO_3$;
from about 1.2 wt % to about 3.6 wt % $CaTiO_3$; and
from about 1.6 wt % to about 4.8 wt % $CaZrO_3$.

Item 32. The dielectric paste of item 31, wherein the solids portion further comprises at least one selected from the group consisting of:
from about 0.01 wt % to about 7.3 wt % $BaTiO_3$;
from about 0.01 wt % to about 1.0 wt % $B_2O_3$;
from about 0.01 wt % to about 1.47 wt % MgO;
from about 0.01 wt % to about 1.78 wt % $H_3BO_3$; and
from about 0.01 wt % to about 2.14 wt % $Mg(OH)_2$.

Item 33. A method of forming an electronic component comprising:
applying the dielectric paste of item 31 or item 32 to a substrate; and
firing the substrate at a temperature sufficient to sinter the dielectric material.

Item 34. The method of item 33, wherein the firing is conducted at a temperature of from about 1200° C. to about 1350° C.

Item 35. The method of item 33, wherein the firing is conducted in an atmosphere having a partial oxygen pressure of about $10^{-12}$ atm to about $10^{-8}$ atm.

Item 36. A multilayer ceramic chip capacitor comprising a fired collection of alternately stacked:
layers of the dielectric material of item 31 or item 32; and
layers of an internal electrode material comprising a transition metal other than Ag, Au, Pd, or Pt.

Item 37. The multilayer ceramic chip capacitor of item 36, wherein the internal electrode material comprises nickel.

Item 38. A method of forming an electronic component comprising:
alternately applying:
layers of the dielectric paste of item 31 or item 32, and
layers of a metal-containing electrode paste
onto a substrate to form a laminar stack;
cutting the laminar stack to a predetermined shape;
separating the cut stack from the substrate; and
firing the stack to densify the metal in the electrode paste and sinter the dielectric paste, wherein the internal electrode layer and the dielectric layer each have a layer thickness.

Item 39. The method of item 38, wherein the layers of dielectric, after firing, have a thickness of about 1 micron to about 50 microns.

Item 40. The method of item 38, wherein the firing is conducted at a temperature of from about 1200° C. to about 1350° C.

Item 41. The method of item 38, wherein the firing is conducted in an atmosphere having a partial oxygen pressure of about $10^{-12}$ atm to about $10^{-8}$ atm.

Item 42. The method of item 38, wherein the metal-containing electrode paste comprises nickel.

Item 43. A lead-free and cadmium-free dielectric paste comprising a solids portion wherein the solids portion comprises:
from about 47.8 wt % to about 61.3 wt % $BaZrO_3$;
from about 39.4 wt % to about 53.6 wt % $SrZrO_3$;
from about 1.2 wt % to about 3.6 wt % $CaTiO_3$;
from about 0.1 wt % to about 2.14 wt % $Mg(OH)_2$; and
from about 0.1 wt % to about 1.78 wt % $H_3BO_3$.

Item 44. A method of forming an electronic component comprising:
applying the dielectric paste of item 43 to a substrate; and
firing the substrate at a temperature sufficient to sinter the dielectric paste.

Item 45. The method of item 44, wherein the firing is conducted at a temperature of from about 1200° C. to about 1350° C.

Item 46. The method of item 44, wherein the firing is conducted in an atmosphere having a partial oxygen pressure of about $10^{-12}$ atm to about $10^{-8}$ atm.

Item 47. A multilayer ceramic chip capacitor comprising a fired collection of alternately stacked;
layers of the dielectric paste of item 43; and
layers of an internal electrode material comprising a transition metal other than Ag, Au, Pd, or Pt.

Item 48. The multilayer ceramic chip capacitor of item 47, wherein the internal electrode material comprises nickel.

Item 49. A method of forming an electronic component comprising:
alternately applying layers of
a dielectric material comprising the paste of item 43, and
a metal-containing electrode paste onto a substrate to form a laminar stack;
cutting the laminar stack to a predetermined shape;
separating the cut stack from the substrate; and
firing the stack to density the metal in the electrode paste and sinter the dielectric paste, wherein the internal electrode layer and the dielectric layer each have a layer thickness.

Item 50. The method of item 49, wherein the layers of dielectric, after firing, have a thickness of about 1 micron to about 50 microns.

Item 51. The method of item 49, wherein the firing is conducted at a temperature of from about 1200° C. to about 1350° C.

Item 52. The method of item 49, wherein the firing is conducted in an atmosphere having a partial oxygen pressure of about $10^{-12}$ atm to about $10^{-8}$ atm.

Item 53. The method of item 49, wherein the metal-containing electrode paste comprises nickel.

Item 54. The method of any of items 14, 26, 38 or 49, further comprising applying a copper containing paste to the ends of the dielectric and electrode layers and firing to form a multilayer capacitor.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

The invention claimed is:

1. A composition comprising a mixture of precursors that, upon firing, forms a dielectric material comprising:
from about 26.5 wt % to about 34.0 wt % BaO;
from about 18.0 wt % to about 24.5 wt % SrO;
from about 41.0 wt % to about 50.0 wt % $ZrO_2$;
from about 0.50 wt % to about 1.50 wt % CaO; and
from about 0.70 wt % to about 2.50 wt % $TiO_2$.

2. The composition according to claim 1, further comprising precursors such that upon firing the dielectric material further comprises:
from about 0.01 to about 1.0 wt % $B_2O_3$; and
from about 0.01 to about 1.47 wt % MgO.

3. A lead-free and cadmium-free dielectric paste comprising a solids portion wherein the solids portion comprises the dielectric material of claim 1.

4. The lead-free and cadmium-free dielectric paste of claim 3, wherein the solids portion further comprises at least one selected from the group consisting of:
from about 0.01 wt % to about 1.0 wt % $B_2O_3$;
from about 0.01 wt % to about 1.47 wt % MgO;
from about 0.01 wt % to about 1.78 wt % $H_3BO_3$; and
from about 0.01 wt % to about 2.14 wt % $Mg(OH)_2$.

5. A method of forming an electronic component comprising:
applying the dielectric paste of claim 4 to a substrate; and
firing the substrate at a temperature sufficient to sinter the dielectric paste.

6. The method of claim 5, wherein the firing is conducted at a temperature of from about 1200° C. to about 1350° C.

7. A multilayer ceramic chip capacitor comprising a fired collection of alternately stacked:
layers of the dielectric paste of claim 4; and
layers of an internal electrode material comprising a transition metal other than Ag, Au, Pd, or Pt.

8. The multilayer ceramic chip capacitor of claim 7, wherein the internal electrode material comprises nickel.

9. A method of forming an electronic component comprising:
alternately applying layers of
the dielectric paste of claim 4, to form at least one dielectric layer and
a metal-containing electrode paste, to form at least one internal electrode layer
onto a substrate to form a laminar stack;
cutting the laminar stack to a predetermined shape;
separating the cut stack from the substrate; and
firing the stack to densify the metal in the electrode paste and sinter the dielectric paste, wherein the internal electrode layer and the dielectric layer each have a layer thickness.

10. The method of claim 9, wherein the firing is conducted at a temperature of from about 1200° C. to about 1350° C.

11. The method of claim 9, wherein the firing is conducted in an atmosphere having a partial oxygen pressure of about $10^{-12}$ atm to about $10^{-8}$ atm.

12. A lead-free and cadmium-free dielectric composition comprising:
from about 47.8 wt % to about 61.3 wt % $BaZrO_3$;
from about 39.4 wt % to about 53.6 wt % $SrZrO_3$;
from about 1.2 wt % to about 3.6 wt % $CaTiO_3$;
from about 0.1 wt % to about 2.14 wt % $Mg(OH)_2$; and
from about 0.1 wt % to about 1.78 wt % $H_3BO_3$.

13. A lead-free and cadmium-free dielectric paste comprising a solids portion wherein the solids portion comprises:
from about 47.8 wt % to about 61.3 wt % $BaZrO_3$;
from about 39.4 wt % to about 53.6 wt % $SrZrO_3$;
from about 1.2 wt % to about 3.6 wt % $CaTiO_3$;
from about 0.1 wt % to about 2.14 wt % $Mg(OH)_2$; and
from about 0.1 wt % to about 1.78 wt % $H_3BO_3$.

14. A method of forming an electronic component comprising:
applying the dielectric paste of claim 13 to a substrate; and
firing the substrate at a temperature sufficient to sinter the dielectric paste.

15. The method of claim 14, wherein the firing is conducted at a temperature of from about 1200° C. to about 1350° C.

16. The method of claim 14, wherein the firing is conducted in an atmosphere having a partial oxygen pressure of about $10^{-12}$ atm to about $10^{-8}$ atm.

17. A multilayer ceramic chip capacitor comprising a fired collection of: alternately stacked:
layers of the dielectric paste of claim 13; and
layers of an internal electrode material comprising a transition metal other than Ag, Au, Pd, or Pt.

18. The multilayer ceramic chip capacitor of claim 17, wherein the internal electrode material comprises nickel.

19. A method of forming an electronic component comprising:
alternately applying layers of
a dielectric material comprising the paste of claim 13 to form at least one dielectric layer and a metal-containing electrode paste to form at least one internal electrode layer
onto a substrate to form a laminar stack;
cutting the laminar stack to a predetermined shape;
separating the cut stack from the substrate; and
firing the stack to densify the metal in the electrode paste and sinter the dielectric paste, wherein the at least one internal electrode layer and the at least one dielectric layer each have a layer thickness.

20. The method of claim 19, wherein the firing is conducted at a temperature of from about 1200° C. to about 1350° C.

21. The method of claim 19, wherein the firing is conducted in an atmosphere having a partial oxygen pressure of about $10^{-12}$ atm to about $10^{-8}$ atm.

* * * * *

UNITED STATES PATENT AND TRADEMARK OFFICE
CERTIFICATE OF CORRECTION

| | | |
|---|---|---|
| PATENT NO. | : 9,852,848 B2 | Page 1 of 1 |
| APPLICATION NO. | : 15/317545 | |
| DATED | : December 26, 2017 | |
| INVENTOR(S) | : Symes, Jr. et al. | |

It is certified that error appears in the above-identified patent and that said Letters Patent is hereby corrected as shown below:

On the Title Page

Item (12) "Symes, Jr." should read -- Symes, Jr., et al. --.

Item (72) Inventor is corrected to read:
-- Walter J. Symes, Jr., Dundee (NY);
Mohammed H. Megherhi, Victor (NY) --.

Signed and Sealed this
Second Day of April, 2019

Andrei Iancu
*Director of the United States Patent and Trademark Office*